(12) United States Patent
Zou et al.

(10) Patent No.: US 11,210,334 B2
(45) Date of Patent: Dec. 28, 2021

(54) METHOD, APPARATUS, SERVER AND STORAGE MEDIUM FOR IMAGE RETRIEVAL

(71) Applicant: Baidu Online Network Technology (Beijing) Co., Ltd., Beijing (CN)

(72) Inventors: Hongjian Zou, Beijing (CN); Gaolin Fang, Beijing (CN); Hailang Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 7 days.

(21) Appl. No.: 16/507,277

(22) Filed: Jul. 10, 2019

(65) Prior Publication Data
US 2020/0034384 A1 Jan. 30, 2020

(30) Foreign Application Priority Data
Jul. 27, 2018 (CN) .......................... 201810848059.4

(51) Int. Cl.
| | | |
|---|---|---|
| G06F 16/51 | (2019.01) | |
| G06F 16/535 | (2019.01) | |
| G06F 16/953 | (2019.01) | |
| G06F 16/215 | (2019.01) | |
| G06F 16/538 | (2019.01) | |

(Continued)

(52) U.S. Cl.
CPC .......... *G06F 16/51* (2019.01); *G06F 16/215* (2019.01); *G06F 16/319* (2019.01); *G06F 16/535* (2019.01); *G06F 16/538* (2019.01); *G06F 16/58* (2019.01); *G06F 16/951* (2019.01); *G06F 16/953* (2019.01)

(58) Field of Classification Search
CPC ........ G06F 16/51; G06F 16/58; G06F 16/319; G06F 16/951; G06F 16/535; G06F 16/953; G06F 16/215; G06F 16/538
See application file for complete search history.

(56) References Cited

U.S. PATENT DOCUMENTS

| | | | | |
|---|---|---|---|---|
| 8,909,625 | B1 * | 12/2014 | Stewenius | G06F 16/54 |
| | | | | 707/723 |
| 2002/0099700 | A1 * | 7/2002 | Li | G06F 16/951 |

(Continued)

FOREIGN PATENT DOCUMENTS

| | | |
|---|---|---|
| CN | 101097578 A | 1/2008 |
| CN | 102270234 A | 12/2011 |

(Continued)

*Primary Examiner* — Roberto Borja
(74) *Attorney, Agent, or Firm* — Lathrop GPM LLP

(57) ABSTRACT

Embodiments of the present disclosure disclose a method, apparatus, server and storage medium for image retrieval. The method includes: identifying a plurality of groups of images having identical contents from images on all webpages; aggregating, for each image group, image-related texts on all source webpages of each image to obtain text descriptions of each image group; establishing an inverted index for each image in the image groups based on the text descriptions of the image group, the inverted index at least including, for each text description, source webpages corresponding to all text descriptions of the image group of the text description; and performing image retrieval based on an inputted query and the inverted index.

9 Claims, 6 Drawing Sheets

(51) Int. Cl.
   *G06F 16/951*   (2019.01)
   *G06F 16/31*    (2019.01)
   *G06F 16/58*    (2019.01)

(56) References Cited

U.S. PATENT DOCUMENTS

| | | | | |
|---|---|---|---|---|
| 2006/0251338 | A1* | 11/2006 | Gokturk | G06F 16/583 |
| | | | | 382/305 |
| 2007/0266001 | A1* | 11/2007 | Williams | G06F 16/438 |
| 2008/0097981 | A1* | 4/2008 | Williams | G06F 16/58 |
| 2008/0133483 | A1* | 6/2008 | Bayley | G06F 16/355 |
| 2010/0145923 | A1* | 6/2010 | Wang | G06F 16/9535 |
| | | | | 707/708 |
| 2011/0191211 | A1 | 8/2011 | Lin | |
| 2015/0046781 | A1* | 2/2015 | Baker | G06F 16/951 |
| | | | | 715/205 |
| 2017/0235746 | A1* | 8/2017 | Tang | G06F 16/2282 |
| | | | | 707/692 |
| 2018/0018390 | A1* | 1/2018 | Zhang | G06F 16/951 |
| 2018/0232451 | A1* | 8/2018 | Lev-Tov | G06N 3/08 |

FOREIGN PATENT DOCUMENTS

| | | |
|---|---|---|
| CN | 102819556 A | 12/2012 |
| CN | 104504109 A | 4/2015 |

\* cited by examiner

METHOD, APPARATUS, SERVER AND STORAGE MEDIUM FOR IMAGE RETRIEVAL

CROSS-REFERENCE TO RELATED APPLICATIONS

This application claims priority to Chinese Patent Application No. 201810848059.4, filed on Jul. 27, 2018, titled "Method, Apparatus, Server and Storage Medium for Image Retrieval," which is hereby incorporated by reference in its entirety.

TECHNICAL FIELD

Embodiments of the present disclosure relate to the technical field of Internet, and in particular to, a method, apparatus, server and storage medium for image retrieval.

BACKGROUND

With the development of the network information technology, data on the Internet show explosive growth, so that users have increasing demands for quickly and accurately finding desired image information from the Internet data.

In the existing technology, text information describing an image is obtained by the operations, such as analyzing webpages, acquiring a text around the image, performing a word segmentation and normalization on the text, and an inverted index is established for the image based on the text information. When a user is looking for a desired image using an image retrieval system, the image retrieval system implements image retrieval based on a query inputted by the user according to the inverted index.

However, in the existing technology, a page including the image is used as a basic unit, i.e., only image texts included on a given page is used as an independent unit, an image-related text is determined based on the basic unit, and the inverted index of the image is established based on the related text. However, if a query is "AB", i.e., the corresponding query expression is "AANDB" (i.e., both A and B must be hit), each of source pages f1 and f2 includes a given image, and source page f1 only contains a word "A," while source page f2 only contains a word "B," then the query demand for the above query expression cannot be met, nor can the image be recalled.

SUMMARY

Embodiments of the present disclosure provide a method, apparatus, server and storage medium for image retrieval, in order to achieve the goal of accurately recalling cross-page hit image retrieval results.

In a first aspect, an embodiment of the present disclosure provides a method for image retrieval, including the following steps:

identifying a plurality of groups of images having identical contents from images on all webpages;

aggregating, for each of the image groups, image-related texts on all source webpages of the images to obtain text description of the image group;

establishing an inverted index for each image of the image groups based on the text descriptions of each image group, the inverted index at least including, for each of the text descriptions, source webpages corresponding to all text descriptions of the image group of the text description; and performing image retrieval based on an inputted query and the inverted index.

In a second aspect, an embodiment of the present disclosure further provides an apparatus for image retrieval, including the following modules:

an identifying module, configured for identifying a plurality of groups of images having identical contents from images on all webpages;

an aggregating module, configured for aggregating, for each of the image groups, image-related texts on all source webpages of the images to obtain text description of the image group;

an inverted index establishing module, configured for establishing an inverted index for each image of the image groups based on the text descriptions of each image group, the inverted index at least including, for each of the text descriptions, source webpages corresponding to all text descriptions of the image group of the text description; and a retrieving module, configured for performing image retrieval based on an inputted query and the inverted index.

In a third aspect, an embodiment of the present disclosure further provides a server, including:

one or more processors; and a memory, configured for storing one or more programs, where the one or more programs, when executed by the one or more processors, cause the one or more processors to implement the method for image retrieval according to any one embodiment of the present disclosure.

In a fourth aspect, an embodiment of the present disclosure further provides a computer readable storage medium storing a computer program thereon, where the program, when executed by a processor, implements the method for image retrieval according to any one embodiment of the present disclosure.

According to the embodiments of the present disclosure, a method, an apparatus, a server and a storage medium for image retrieval are provided. groups of images having identical contents are acquired, image-related texts on all source webpages of each image in the image groups are aggregated to obtain text descriptions of the image group, and an inverted index is established for each image of the image groups based on the text descriptions, so that users can perform image retrieval based on the established inverted index. Therefore, the present disclosure realizes aggregating relevant source webpages using an image as a basic unit and using the aggregated relevant source webpages as text description information of the image for establishing an inverted index, which can accurately recall cross-page hit results, and can also accurately recall a long query or a query having a plurality of definitives.

DETAILED DESCRIPTION OF EMBODIMENTS

The present disclosure will be further described below in detail in combination with the accompanying drawings and the embodiments. It should be appreciated that the specific embodiments described herein are merely used for explaining the present disclosure, rather than limiting the present disclosure. In addition, it should also be noted that, for the ease of description, only the parts related to the present disclosure, instead of the whole structure, are shown in the accompanying drawings.

Embodiment I

Figure 1:
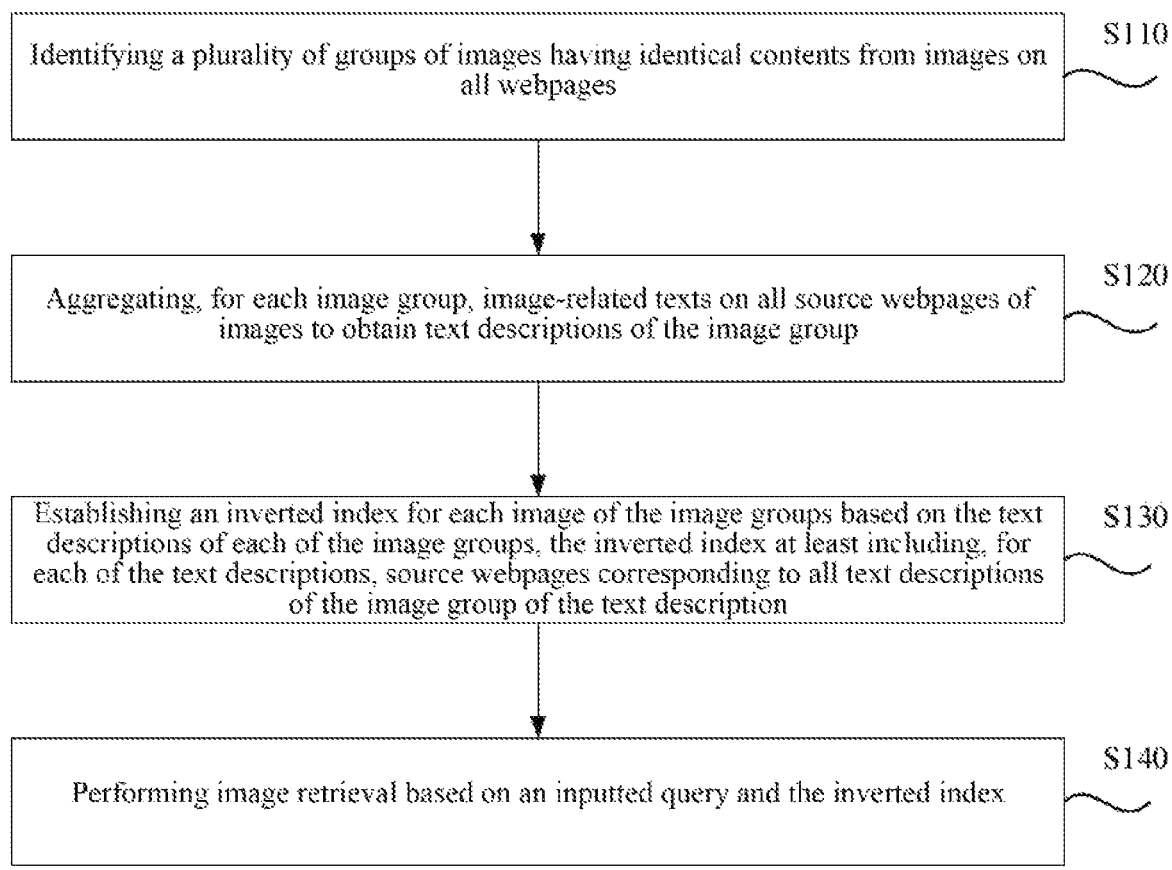
FIG. 1 is a flowchart of a method for image retrieval provided in Embodiment I of the present disclosure.

FIG. 1 is a flowchart of a method for image retrieval provided in Embodiment I of the present disclosure. The present embodiment is applicable to an image retrieval, and in particular to an image retrieval using a long query or a query having a plurality of definitives. The method may be executed by an apparatus for image retrieval. The apparatus may be implemented by software and/or hardware, and may be disposed in a server. As shown in FIG. 1, the method specifically includes the following steps S110 to S140.

S110 includes identifying a plurality of groups of images having identical contents from images on all webpages.

With the continuous development of network technology, images, an important information expression form, are inevitably used on various webpages. In addition, with the continuous expansion of the data network scale, often a plurality of different webpages all include one or more images having identical contents. The images having identical contents include completely identical images, for example, a given image being shared by a plurality of webpages, and images of different sizes but identical content, i.e., information in two photos being completely identical or similar. Therefore, images on webpages of the Internet can be identified by any one of the existing image identification technologies, and the identified images having identical contents are put in a same image group, thereby obtaining a plurality of groups of images having identical contents.

S120 includes aggregating, for each image group, image-related texts on all source webpages of images to obtain text descriptions of each image group.

In the present embodiment, the image-related text refers to text content located around an image on a source webpage of the image and used for describing the image. Exemplarily, the image-related text may be a paragraph of text below the image. For a plurality of images in each image group, an image-related text corresponding to each image is acquired respectively from a source webpage of the image, exemplarily, acquired by a crawler program, and all of the acquired image-related texts are aggregated. Moreover, text descriptions of each image group are obtained by text processing, such as word segmentation, and text identification, on the aggregated image-related text, where the text descriptions refer to a plurality of keywords, or key phrases, or the like describing content of the images in the image groups.

S130 includes establishing an inverted index for each image of the image groups based on the text descriptions of each of the image groups, the inverted index at least including, for each of the text descriptions, source webpages corresponding to all text descriptions of the image group of the text description.

Specifically, the text descriptions are derived from all source webpages of the images in each image group, and the inverted index is established based on the text descriptions of each image group. As such, the method for establishing an inverted index using a source webpage of an image as a basic unit in the existing technology is changed to aggregating related source webpages using the image as the basic unit, and using the aggregated webpages as the basic unit for indexing, thereby laying the foundation for implementing cross-page recall of the image.

Exemplarily, for any one image group, the text descriptions include keywords A and B, the keywords A and B are included on webpages f1 and f2 respectively, and an image O appears on both the webpages f1 and f2, i.e., the source webpages of the image O are f1 and f2. Then, the webpages f1 and f2 are aggregated together for use as a combination (f1, f2), and a value of the inverted index established with A as the key is "<O, <f1,f2>>," i.e., the established inverted index is A:O<f1, f2>; and a value of the inverted index established with B as the key is "<O, <f1, f2>>," i.e., the established inverted index is B:O<f1, f2>.

S140 includes performing image retrieval based on an inputted query and the inverted index.

The inputted query is matched with text description of the image in the established inverted index, and the corresponding image is recalled based on the matching result. Exemplarily, if expression of the inputted query is "A and B," based on the basic principle of the inverted index, i.e., during retrieval, a zipper of the inverted index is obtained based on each query, and then an intersection set is obtained. Therefore, the intersection set of the zipper of the inverted index of A and the zipper of the inverted index of B is <f1,f2>, and the webpages f1 and f2 are the source webpages of the image O. Thus, the image O can be recalled, thereby achieving the technical effect of cross-page hit recall.

Here, it should also be noted that for image retrieval, the quality of related text of a candidate image directly affects the effect of retrieval recall. If the related text of the image contains much noise, i.e., words contained in the text are unrelated to the image, then many unrelated results are recalled according to the words, while if important words describing the image are absent in the related text, then these related images cannot be recalled. Moreover, according to the method for establishing an inverted index using a source webpage of an image as the basic unit in the existing technology, the images or the webpages are regarded as isolated units, and there is no relationship between images, or between webpages, which can not achieve the cross-page recall. The method for image retrieval provided in the embodiments of the present disclosure establishes an inverted index using an image as the basic unit, which aggregates a plurality of source webpages of images having identical content, and establishes the inverted index based on text descriptions of the image corresponding to the aggregated source webpages, such that the cross-webpage retrieval is achieved, thereby improving the retrieval accuracy, and especially can provide accurate recall for the retrieval of a long query or a plurality of particular queries.

In the present embodiment, images having identical contents are put in a same image group, image-related texts on all source webpages of images in the image group are aggregated to obtain text descriptions of the image group, and an inverted index is established for each image in each group based on the text descriptions, so that users can perform image retrieval based on the established inverted index. Therefore, the present disclosure realizes aggregating relevant source webpages using an image as a basic unit, and using the aggregated relevant source webpages as text description information of the image for establishing the inverted index, can accurately recall cross-page hit results, and can also accurately recall a long query or a query having a plurality of definitives.

Embodiment II

Figure 2:
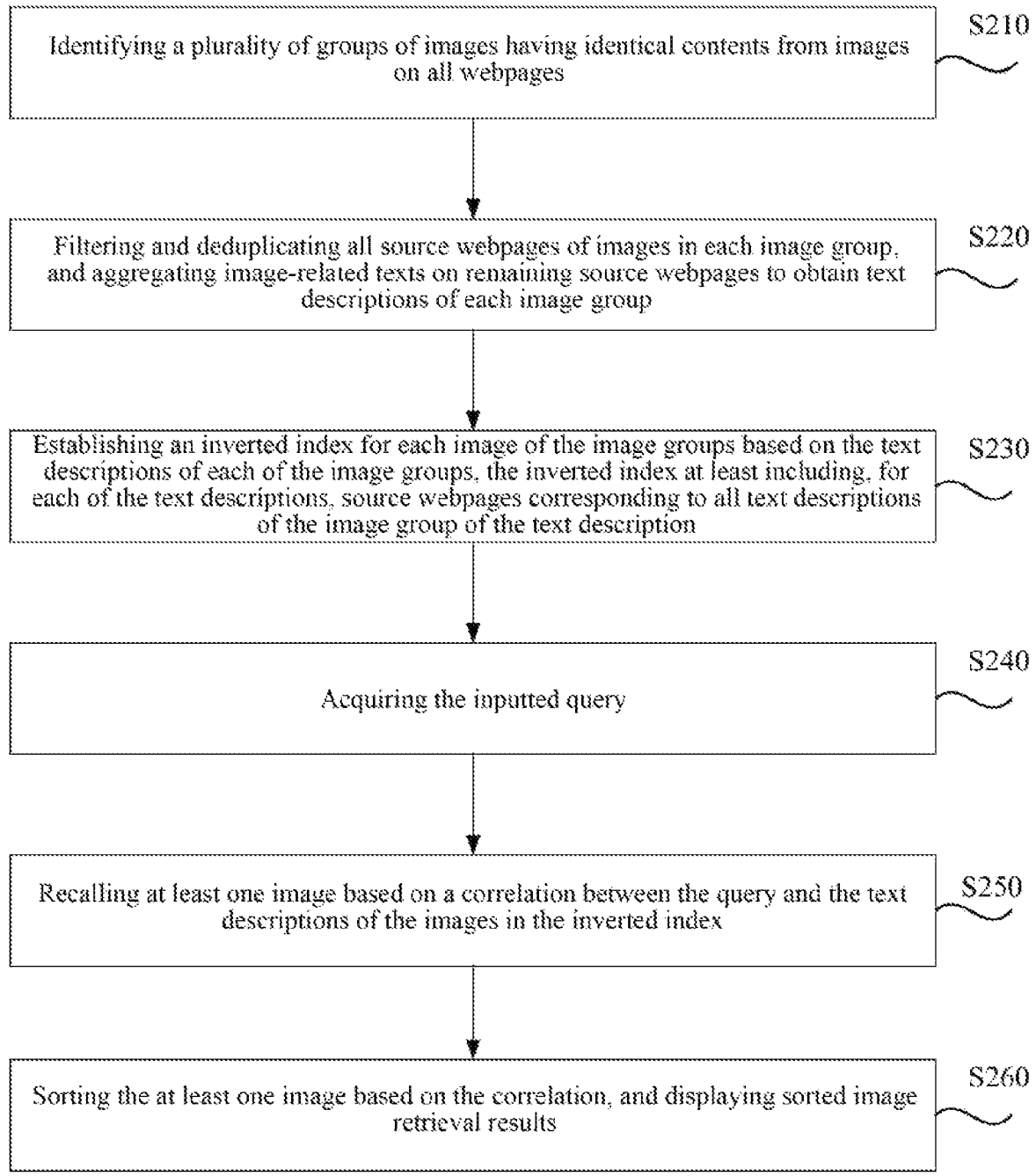
FIG. 2 is a flowchart of a method for image retrieval provided in Embodiment II of the present disclosure.

FIG. 2 is a flowchart of a method for image retrieval provided in Embodiment II of the present disclosure. The present embodiment is further optimization of the above embodiment. As shown in FIG. 2, the method includes the following steps S210 to S260.

S210 includes identifying a plurality of groups of images having identical contents from images on all webpages.

S220 includes filtering and deduplicating all source webpages of images in each image group, and aggregating image-related texts on remaining source webpages to obtain text descriptions of each image group.

The identical images may be included on a plurality of different webpages, and the index content has redundancy if deduplication is not performed. At the same time, texts around some images sourced from low-quality pages are unrelated to the images. If the texts are not processed, quality of the recall may also be affected.

Preferably, all source webpages are filtered and deduplicated, source webpages whose website authority and the like having a highest score, can be retained, low-quality webpages, such as cheating pages, are identified and eliminated using a pre-trained model, and then image-related texts on remaining source webpages are aggregated to obtain text descriptions of each image group.

S230 includes establishing an inverted index for each image of the image groups based on the text descriptions of each of the image groups, the inverted index at least including, for each of the text descriptions, source webpages corresponding to all text descriptions of the image group of the text description.

In the present embodiment, one text description may correspond to a plurality of images. For example, if text description T is included on source webpages m1 and m2 of an image o1, the text description T is also included on a source webpage m3 of an image o2, and o1 and o2 are images having identical contents, then an inverted index established with the text description T as the key includes (m1, m2) and m3, and the text description T corresponds to the image o1 and the image o2.

S240 includes acquiring the inputted query.

The query inputted by a user is acquired, and expression of the query is identified.

S250 includes recalling at least one image based on a correlation between the query and the text descriptions of the images in the inverted index.

In the present embodiment, similarities between the query and the text descriptions of the images in the inverted index are calculated, and whether the correlation indicator is met can be determined based on the obtained similarities. If the correlation indicator between the query and the text description of the image in the inverted index meeting a preset correlation indicator is determined, then at least one image corresponding to the text description is recalled. Exemplarily, based on S230, the similarity between the query and the text description T is calculated to determine the query and the text description T meeting the correlation indicator, and the image o1 and the image o2 corresponding to the text description T can both be recalled.

S260 includes sorting the at least one image based on the correlation, and displaying sorted image retrieval results.

In the present embodiment, the recalled at least one image can be sorted based on the correlations between the query and the text descriptions of the images in the inverted index. If a plurality of images corresponds to a given correlation, then a corresponding coefficient needs to be introduced for punishment to determine a correlation value, thereby determining how to sort the images. Exemplarily, a punishment formula is as follows:

$$\partial = \begin{cases} 1, & \text{non-cross-page hit} \\ 0, & \text{cross-page hit} \end{cases}$$

The value range of θ is (0,1), i.e., at the given correlation, the correlation value is further determined by multiplying a coefficient to ∂ sort the corresponding images, where a non-cross-page hit image is more likely to match a user demand for retrieval than a cross-page hit image. Therefore, here it may be considered that the correlation of cross-page hitting is less than the correlation of non-cross-page hitting, and the corresponding coefficient needs to be introduced for punishment.

If the recalled at least one image includes a first image and a second image, the correlation corresponding to the first image is identical to the correlation corresponding to the second image, the text descriptions corresponding to the first image are derived from different source webpages, and the text description corresponding to the second image is derived from a given source webpage, then the second image is ranked higher than the first image. Specifically, taking the recalled image o1 and image o2 as an example, if the image o1 and the image o2 correspond to given correlation w, and source webpages of the text description T corresponding to the image o1 are m1 and m2, the correlation acquired by multiplying a coefficient θ is wθ which is smaller than w, and a source webpage of the text description T corresponding to the image o2 is m3, and the correlation acquired by multiplying a coefficient ∂ equaling to 1 remains unchanged (still w), then the image o2 is ranked higher than the image o1.

Thus, the sorted image retrieval results are displayed to the user.

In the embodiment of the present disclosure, all source webpages of the images are filtered and deduplicated, image-related texts on remaining source webpages are aggregated to obtain the text descriptions of each image group, and then the inverted index is established for each image based on the text descriptions, thereby solving redundancy problem in the index, achieving abundant and comprehensive text descriptions of the images, and improving accurate cross-page recall. During image retrieval, the recalled at least one image is sorted based on correlation, and the sorted image retrieval results are displayed to the user, thereby achieving preferentially displaying an image meeting the demand to the greatest extent to the user.

Embodiment III

Figure 3:
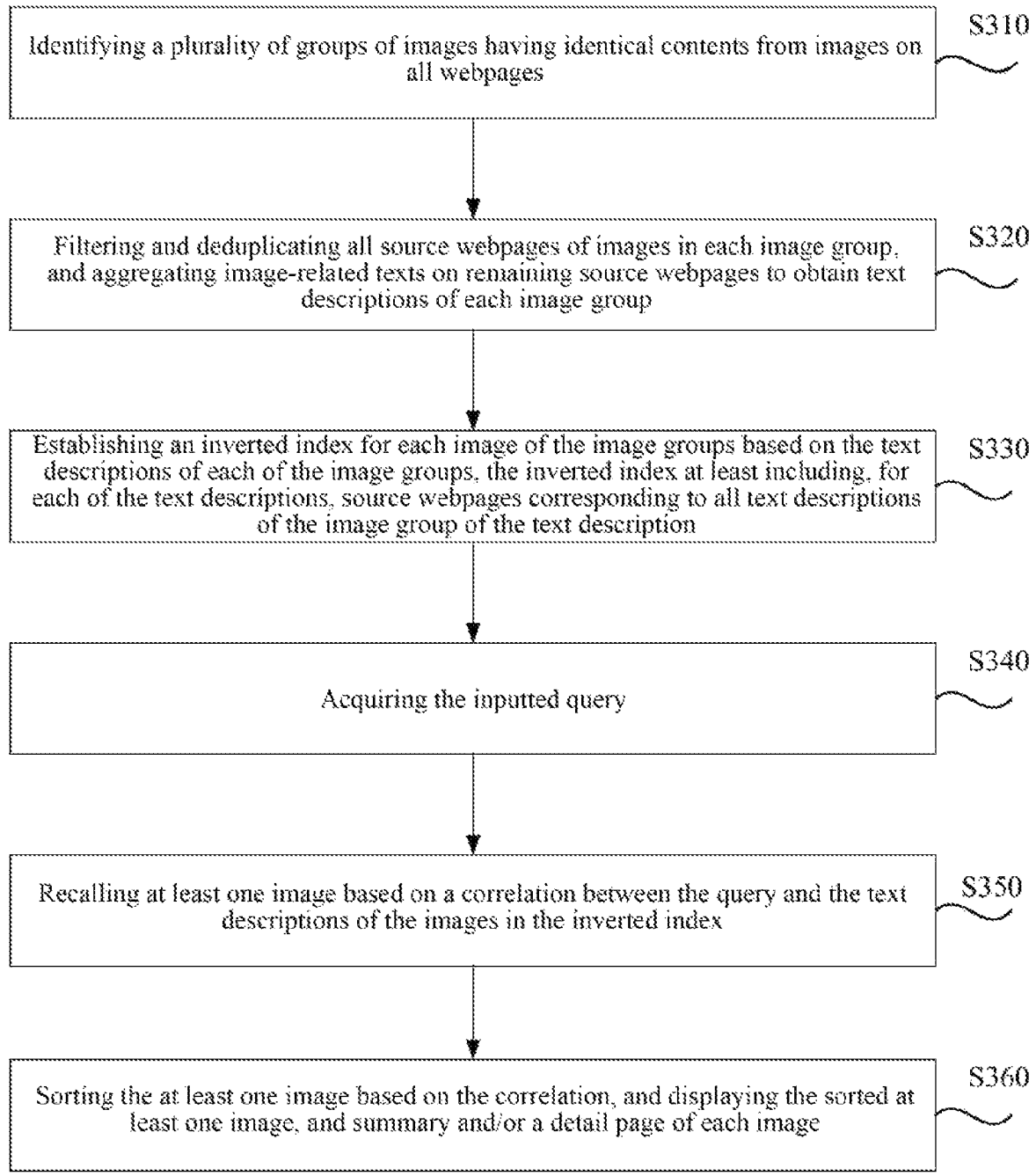
FIG. 3 is a flowchart of a method for image retrieval provided in Embodiment III of the present disclosure.

FIG. 3 is a flowchart of a method for image retrieval provided in Embodiment III of the present disclosure. The present embodiment is further optimization of the above embodiments. As shown in FIG. 3, the method includes the following steps S310 to S360.

S310 includes identifying a plurality of groups of images having identical contents from images on all webpages.

S320 includes filtering and deduplicating all source webpages of images in each image group, and aggregating image-related texts on remaining source webpages to obtain text descriptions of each image group.

S330 includes establishing an inverted index for each image of the image groups based on the text descriptions of each of the image groups, the inverted index at least including, for each of the text descriptions, source webpages corresponding to all text descriptions of the image group of the text description.

S340 includes acquiring the inputted query.

S350 includes recalling at least one image based on correlation between the query and the text descriptions of the images in the inverted index.

S360 includes sorting the at least one image based on the correlation, and displaying the sorted at least one image, and summary and/or a detail page of each image.

In the present embodiment, whilst displaying the sorted at least one image, for each of the sorted at least one image, a link of summary of the image is displayed. Preferably, the link of the summary of the image is a link of a source webpage meeting webpage authority requirements among at least one source webpage of the image.

Whilst displaying the sorted at least one image, the link of summary is displayed and/or a link of the at least one source page corresponding to the image is displayed on a detail page of the image in accordance with a set condition. The set condition includes: webpage authority, page creation time, page updating time, correlation between image description text on the page and the query, and page browsing popularity or user's page filter condition. Specifically, the at least one source page corresponding to the detail page of the image is sorted in accordance with the set condition, and links of top ranked source pages are displayed on the detail page of the image.

Further, association display of the at least one source webpage on the detail page of the image is performed based on correlation between webpages in accordance with the set condition, where the correlation includes a reprinting relationship or a chronological relationship of creation, e.g., preferentially displaying original source webpages.

In the present embodiment, during image retrieval, the at least one image is sorted based on the correlation, the sorted at least one image, and the summary and/or the detail page of each image are displayed. Moreover, for images recalled through cross-webpage retrieval, a plurality of source webpages may also be provided to a user as summary information or the detail page, thereby providing the user with more abundant source information of related images.

Embodiment IV

Figure 4:
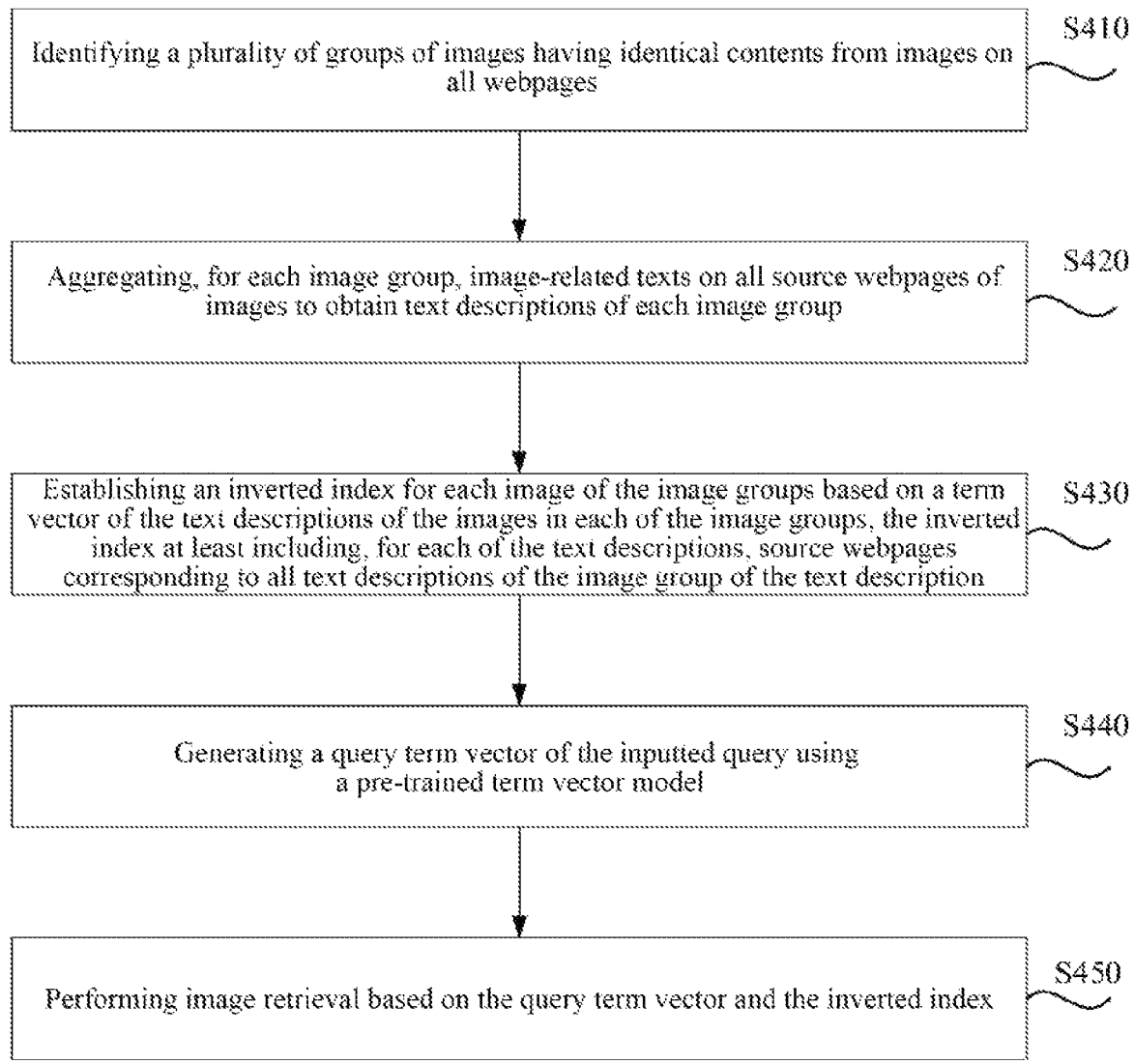
FIG. 4 is a flowchart of a method for image retrieval provided in Embodiment IV of the present disclosure.

FIG. 4 is a flowchart of a method for image retrieval provided in Embodiment IV of the present disclosure. The present embodiment is further optimization of the above embodiments. As shown in FIG. 4, the method includes the following steps S410 to S450.

S410 includes identifying a plurality of groups of images having identical contents from images on all webpages.

S420 includes aggregating, for each image group, image-related texts on all source webpages of images to obtain text descriptions of each image group.

S430 includes establishing an inverted index for each image of the image groups based on a term vector of the text descriptions of the images in each of the image groups, the inverted index at least including, for each of the text descriptions, source webpages corresponding to all text descriptions of the image group of the text description.

The text descriptions of the images are converted into a corresponding term vector using a pre-trained term vector model, and the inverted index is established for each image in the image groups based on the term vector of the text descriptions of the images. The specific method of establishing the inverted index is the same as the method of establishing an inverted index for a specific term.

S440 includes generating a query term vector of the inputted query using the pre-trained term vector model.

Since the inverted index is established based on the term vector of the text descriptions of the images, the inputted query needs to be first converted into a corresponding term vector during image retrieval.

S450 includes performing image retrieval based on the query term vector and the inverted index.

The term vector of the inputted query is matched with the term vector of text descriptions of images in the established inverted index, and the corresponding image is recalled based on the matching result.

In the present embodiment, the text descriptions are converted into a form of a corresponding term vector for establishing an inverted index. Moreover, during image retrieval, the query is also expressed as the form of a term vector, the term vector of the text descriptions of the image is searched, and a most similar result is returned after calculation, thereby improving the efficiency and accuracy of retrieval recall.

Embodiment V

Figure 5:
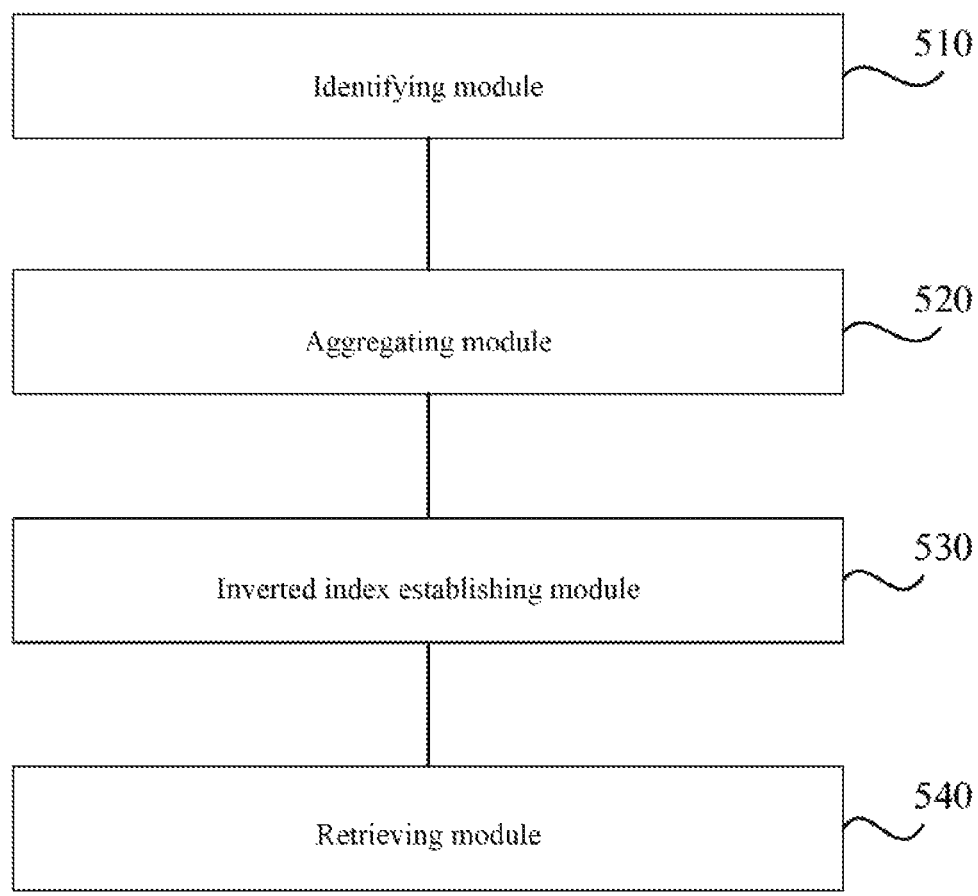
FIG. 5 is a schematic structural diagram of an apparatus for image retrieval provided in Embodiment V of the present disclosure.

FIG. 5 is a schematic structural diagram of an apparatus for image retrieval provided in Embodiment V of the present disclosure. As shown in FIG. 5, the apparatus includes the following modules:

an identifying module 510, configured for identifying a plurality of groups of images having identical contents from images on all webpages;

an aggregating module 520, configured for aggregating, for each image group, image-related texts on all source webpages of images to obtain text descriptions of each image group;

an inverted index establishing module 530, configured for establishing an inverted index for each image of the image groups based on the text descriptions of the each of the image groups, the inverted index at least including, for each of the text descriptions, source webpages corresponding to all text descriptions of the image group of the text description; and a retrieving module 540, configured for performing image retrieval based on an inputted query and the inverted index.

In the present embodiment, the identifying module identifies images having identical contents, and groups the images, the aggregating module acquires text descriptions of each image, the inverted index establishing module establishes an inverted index for each image in image groups, and when a user is performing retrieval, the retrieving module performs image retrieval based on an inputted query and the inverted index. The present embodiment realizes aggregating relevant source webpages using an image as a basic unit, and using the aggregated relevant source webpages as text description information of the image for establishing the inverted index, reduces redundant information of the image index, can accurately recall cross-page hit results, and can also accurately recall a long query or a query having a plurality of definitives.

On the basis of the above embodiments, the aggregating module is specifically configured for:

filtering and deduplicating all source webpages of the images in each image group, and aggregating image-related texts on remaining source webpages to obtain the text descriptions of each image group.

On the basis of the above embodiments, the retrieving module includes the following units:

an acquiring unit, configured for acquiring the inputted query;

a recalling unit, configured for recalling at least one image based on a correlation between the query and the text descriptions of the images in the inverted index; and a sorting displaying unit, configured for sorting the at least one image based on the correlation, and displaying sorted image retrieval results.

On the basis of the above embodiments, the sorting displaying unit is further configured for:

ranking the second image higher than the first image, if correlation corresponding to a first image of the at least one image is identical to correlation corresponding to a second image of the at least one image, text descriptions corresponding to the first image are derived from different source webpages, and text description corresponding to the second image is derived from a given source webpage.

On the basis of the above embodiments, the inverted index establishing module is further configured for:

establishing the inverted index for each image of the image groups based on a term vector of the text descriptions of the each of the image groups; and accordingly, the retrieving module is further configured for:

generating a query term vector of the inputted query using a pre-trained term vector model; and performing image retrieval based on the query term vector and the inverted index.

On the basis of the above embodiments, the sorting displaying unit is further configured for:

displaying the sorted at least one image, and summary and/or a detail page of each of sorted at least one image;

where content of the summary and the detail page of each image is derived from at least one source webpage of the image.

On the basis of the above embodiments, the sorting displaying unit is further configured for:

displaying the sorted at least one image; displaying, for each of the sorted at least one image, a link of summary of the image, the link of the summary of the image being a link of a source webpage meeting webpage authority requirements among at least one source webpage of the image; and/or displaying, on the detail page of the image, the link of the at least one source webpage corresponding to the image in accordance with a set condition;

where the set condition includes: webpage authority, page creation time, page updating time, correlation between image description text on the page and the query, and page browsing popularity or user's page filter condition.

On the basis of the above embodiments, the sorting displaying unit is further configured for:

performing association display of the at least one source webpage on the detail page of the image based on correlation between webpages in accordance with the set condition, where the correlation includes a reprinting relationship or a chronological relationship of the creation.

The apparatus for image retrieval provided in the embodiment of the present disclosure can execute the method for image retrieval provided in any embodiment of the present disclosure, and has corresponding function modules for executing the method and beneficial effects.

Embodiment VI

Figure 6:
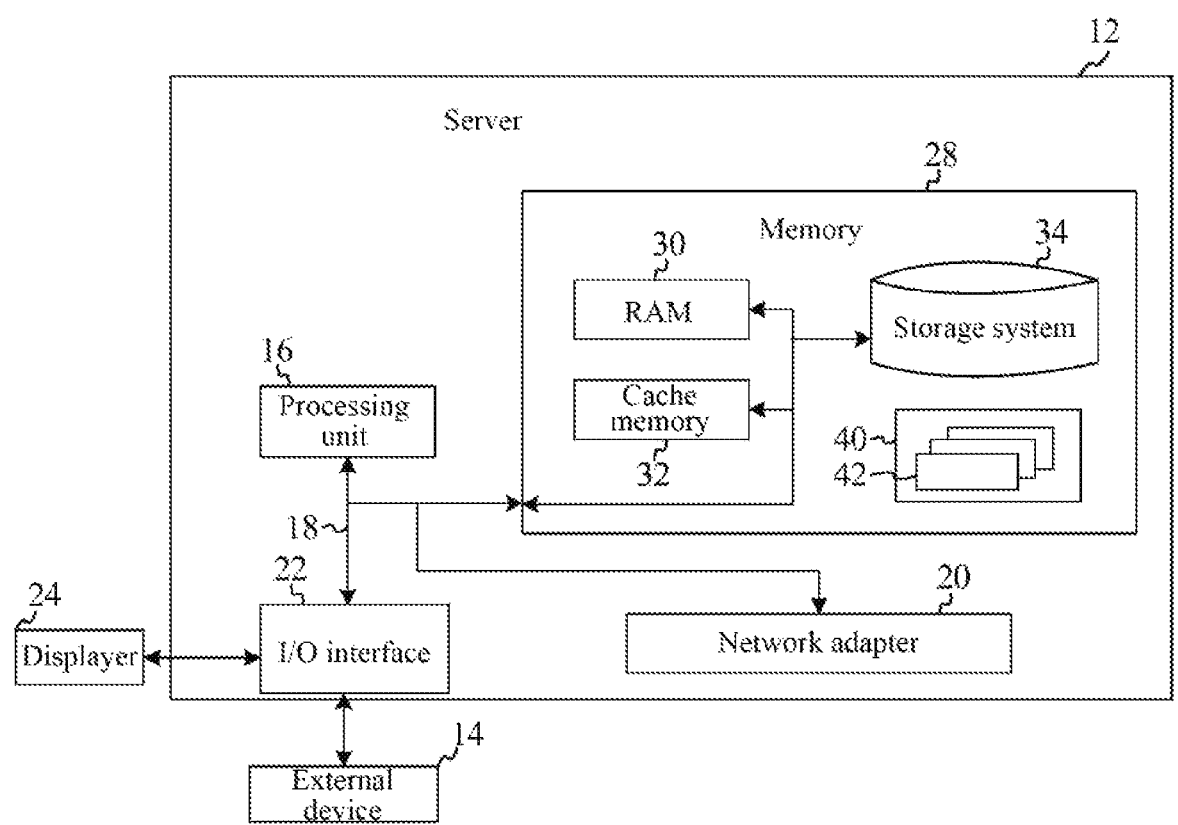
FIG. 6 is a schematic structural diagram of a server provided in Embodiment VI of the present disclosure.

FIG. 6 is a schematic structural diagram of a server provided in Embodiment VI of the present disclosure. FIG. 6 shows a block diagram of an exemplary server 12 adapted to implement the embodiment of the present disclosure. The server 12 shown in FIG. 6 is merely an example, and should not limit the function and scope of use of the embodiments of the present disclosure.

As shown in FIG. 6, the server 12 is expressed in the form of a general-purpose computing device. Components of the server 12 may include, but are not limited to: one or more processors or a processing unit 16, a memory 28, and a bus 18 connecting different system components (including the memory 28 and the processing unit 16).

The bus 18 represents one or more of bus structures, including a memory bus or a memory controller, a peripheral bus, a graphics acceleration port, a processor, or a local bus with any bus structure of a plurality of bus structures. For example, the system structures include, but are not limited to, an industrial standard architecture (ISA) bus, a micro channel architecture (MCA) bus, an enhanced ISA bus, a Video Electronics Standards Association (VESA) local bus, and a peripheral component interconnect (PCI) bus.

The server 12 typically includes a plurality of computer system readable media. These media may be any available medium accessible by the server 12, including volatile media, non-volatile media, removable media and non-removable media.

The memory 28 may include a computer system readable medium in the form of a volatile memory, such as a random access memory (RAM) 30, and/or a cache memory 32. The server 12 may further include other removable/non-removable computer system storage media, and volatile/non-volatile computer system storage media. By way of example only, a storage system 34 can be used for reading from and writing in non-removable and nonvolatile magnetic media (not shown in FIG. 6, usually known as a "hard drive"). A disk driver for reading from and writing in a removable non-volatile disk (such as a "floppy disk") and an optical driver for reading from and writing in a removable non-volatile disk (such as CD-ROM, DVD-ROM, or other optical media) may be provided, though the disk driver or the optical driver is not shown in FIG. 6. With such arrangements, each driver may be connected to the bus 18 through one or more data media interfaces. The memory 28 may include at least one program product, the program product has a set of (e.g., at least one) program modules, and the program modules are configured to execute the functions of the embodiments of the present disclosure.

A program/utility software 40 with a set of (at least one) program module 42 may be stored in, e.g., the memory 28. Such a program module 42 includes, but is not limited to, an operating system, one or more application programs, other program modules, and program data. Each of these examples or a combination thereof may include implementation of a network environment. The program module 42 generally executes the functions and/or method according to the embodiments of the present disclosure.

The server 12 may also communicate with one or more external devices 14 (e.g., a keyboard, a pointing device, and a displayer 24), and may also communicate with one or more devices that enable a user to interact with the server 12, and/or communicates with any device (e.g., a network card, and a modem) that enables the device 12 to communicate with one or more of other computing devices. This communication may be performed through an input/output (I/O) interface 22. Moreover, the server 12 may further communicate with one or more networks (e.g., a local area network (LAN), a wide area network (WAN), and/or a public network such as the Internet) through a network adapter 20. As shown in the figure, the network adapter 20 communicates with other modules of the server 12 through the bus 18. It should be appreciated that, other hardware and/or software modules may be used in combination with the server 12, including but not limited to: a microcode, a device driver, a redundancy processing unit, an external disk drive array, a RAID system, a tape driver, and a data backup storage system, though the modules are not shown in the figure.

The processing unit 16 executes various functional applications and data processing by running a program stored in the memory 28, such as implementing the method for image retrieval provided in the embodiments of the present disclosure. The method includes the following steps:

identifying a plurality of groups of images having identical contents from images on all webpages;

aggregating, for each image group, image-related texts on all source webpages of images to obtain text descriptions of each image group;

establishing an inverted index for each image of the image groups based on the text descriptions of each of the image groups, the inverted index at least including, for each of the text descriptions, source webpages corresponding to all text descriptions of the image group of the text description; and performing image retrieval based on an inputted query and the inverted index.

Embodiment VII

An embodiment of the present disclosure provides a storage medium including a computer executable instruction, where the computer executable instruction, when executed by a computer processor, is used for executing a method for image retrieval. The method includes the following steps:

identifying a plurality of groups of images having identical contents from images on all webpages;

aggregating, for each image group, image-related texts on all source webpages of image to obtain text descriptions of each image group;

establishing an inverted index for each image of image groups based on the text descriptions of each of the image groups, the inverted index at least including, for each of the text descriptions, source webpages corresponding to all text descriptions of the image group of the text description; and performing image retrieval based on an inputted query and the inverted index.

For the storage medium including the computer executable instruction provided in the embodiment of the present disclosure, the computer executable instruction is not limited to the operations of the method as described above, and can also execute related operations in the method for image retrieval provided in any embodiment of the present disclosure.

Any combination of one or more computer readable media may be used as the computer storage medium of the embodiment of the present disclosure. The computer readable medium may be a computer readable signal medium or a computer readable storage medium. The computer readable storage medium may, for example, include, but is not limited to: an electric, magnetic, optical, electromagnetic, infrared, or semiconductor system, apparatus, component, or any combination thereof. A more specific example (non-enumerated enumerated list) of the computer readable storage medium may include, but is not limited to: electrical connection with one or more wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination thereof Herein, the computer readable storage medium may be any tangible medium containing or storing programs which may be used by a command execution system, apparatus, or component or incorporated thereto.

The computer readable signal medium may include data signal in the base band or propagating as parts of a carrier wave, in which computer readable program codes are carried. The propagating data signal may take various forms, including but not limited to: an electromagnetic signal, an optical signal or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element.

The program codes contained on the computer readable medium may be transmitted with any suitable medium, including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

It should be noted that, the above description only provides preferred embodiments of the present disclosure and the employed technical principles. It should be appreciated by those skilled in the art that the present disclosure is not limited to the particular embodiments described herein. Those skilled in the art can make various obvious changes, readjustments, and replacements without departing from the scope of protection of the present disclosure. Therefore, while the present disclosure is illustrated in detail in combination with the above embodiments, the present disclosure is not only limited to the above embodiments, and can further include more other equivalent embodiments without departing from the concept of the present disclosure. The scope of the present disclosure is defined by the scope of the appended claims.

What is claimed is:

1. A method for image retrieval, comprising:
identifying a plurality of groups of images having identical contents from images on all webpages;
aggregating, for each of the image groups, image-related texts on all source webpages of the images to obtain text descriptions of the each image group;
establishing an inverted index for each image of the image groups based on the text descriptions of the each image group, the inverted index comprising a plurality of entries, wherein each of the entries comprises a keyword of the text description of a given image, an identifier of the given image, and one or more identifiers of one or more source webpages of the text description of the given image;
performing image retrieval and recalling at least one image based on an inputted query and the inverted index;
displaying the at least one image,
wherein the performing image retrieval and recalling at least one image based on an inputted query and the inverted index, and displaying the at least one image comprises:
acquiring the inputted query;
recalling the at least one image based on a correlation between the query and the text descriptions of the images in the inverted index; and
sorting the at least one image based on the correlation between the query and the text descriptions of the images in the inverted index, and displaying sorted image retrieval results,
wherein the sorting comprises: determining that a first correlation between the query and a first keyword in a first entry including a first identifier of a first image is equal to a second correlation between the query and a second keyword in a second entry including a second identifier of a second image; determining that a first number of source webpages of the first image in the first entry is greater than a second number of source webpages of the second image in the second entry; and ranking the second image higher than the first image, in response to determining that the first correlation is equal to the second correlation, and the first number is greater than the second number, wherein the establishing an inverted index for each image of the image groups based on the text descriptions of the each image group comprises:
establishing the inverted index for the each image in the image groups based on a term vector of the text descriptions of the each image group; and
accordingly, the performing image retrieval based on the inputted query and the inverted index comprises:
generating a query term vector of the inputted query using a pre-trained term vector model; and
performing an image retrieval based on the query term vector and the inverted index.

2. The method according to claim 1, wherein the aggregating, for each of the image groups, image-related texts on all source webpages of the images to obtain text descriptions of the each image group comprises:
filtering and deduplicating all source webpages of the images in the each image group, and aggregating image-related texts on remaining source webpages to obtain the text descriptions of the each image group.

3. The method according to claim 1, wherein the displaying sorted image retrieval results comprises:
displaying the sorted at least one image, and summary and/or a detail page of each of the sorted at least one image;
wherein content of the summary and the detail page of the each image is derived from at least one source webpage of the each image.

4. The method according to claim 3, wherein the displaying the sorted at least one image, and summary and/or a detail page of each of the sorted at least one image comprises:
displaying the sorted at least one image, and displaying, for each of the sorted at least one image, a link of summary of the image, the link of the summary of the image being a link of a source webpage meeting webpage authority requirements among at least one source webpage of the each image;
wherein the method further comprises performing association display of at least one source webpage corresponding to each of the at least one image on a detail page of the each image based on a correlation between webpages in accordance with a set condition, wherein the correlation includes a reprinting relationship or a chronologic relationship of creation, wherein the set condition includes: webpage authority, page creation time, page updating time, a correlation between image description text on the page and the query, and page browsing popularity or a page filter condition of a user.

5. The method according to claim 1, wherein the method further comprises:
performing association display of at least one source webpage corresponding to each of the at least one image on a detail page of the each image based on a correlation between webpages in accordance with a set condition, wherein the correlation includes a reprinting relationship or a chronologic relationship of creation.

6. The method according to claim 5, wherein the set condition includes at least one of: webpage authority, page creation time, page updating time, a correlation between image description text on the page and the query, page browsing popularity, or a page filter condition of a user.

7. An apparatus for image retrieval, comprising:
at least one processor; and
a memory storing instructions, wherein the instructions when executed by the at least one processor, cause the at least one processor to perform operations, the operations comprising:
identifying a plurality of groups of images having identical contents from images on all webpages;
aggregating, for each of the image groups, image-related texts on all source webpages of the images to obtain text descriptions of the each image group;
establishing an inverted index for each image of the image groups based on the text descriptions of the each image group, the inverted index comprising a plurality of entries, wherein each of the entries comprises a keyword of the text description of a given image, an identifier of the given image, and one or more identifiers of one or more source webpages of the text description of the given image;
performing image retrieval based on an inputted query and the inverted index;
displaying the at least one image, wherein the performing image retrieval and recalling at least one image based on an inputted query and the inverted index, and displaying the at least one image comprises:

acquiring the inputted query;

recalling the at least one image based on a correlation between the query and the text descriptions of the images in the inverted index; and sorting the at least one image based on the correlation between the query and the text descriptions of the images in the inverted index, and displaying sorted image retrieval results, wherein the sorting comprises: determining that a first correlation between the query and a first keyword in a first entry including a first identifier of a first image is equal to a second correlation between the query and a second keyword in a second entry including a second identifier of a second image; determining that a first number of source webpages of the first image in the first entry is greater than a second number of source webpages of the second image in the second entry; and ranking the second image higher than the first image, in response to determining that the first correlation is equal to the second correlation, and the first number is greater than the second number, wherein the establishing an inverted index for each image of the image groups based on the text descriptions of the each image group comprises:

establishing the inverted index for the each image in the image groups based on a term vector of the text descriptions of the each image group; and accordingly, the performing image retrieval based on the inputted query and the inverted index comprises:

generating a query term vector of the inputted query using a pre-trained term vector model; and performing an image retrieval based on the query term vector and the inverted index.

8. The apparatus according to claim 7, wherein the aggregating, for each of the image groups, image-related texts on all source webpages of the images to obtain text descriptions of the each image group comprises:

filtering and deduplicating all source webpages of images in the each image group, and aggregating image-related texts on remaining source webpages to obtain the text descriptions of the each image group.

9. A non-transitory computer readable storage medium, storing a computer program thereon, wherein the program, when executed by a processor, causes the processor to perform operations, the operations comprising:

identifying a plurality of groups of images having identical contents from images on all webpages;

aggregating, for each of the image groups, image-related texts on all source webpages of the images to obtain text descriptions of the each image group;

establishing an inverted index for each image of the image groups based on the text descriptions of the each image group, the inverted index comprising a plurality of entries, wherein each of the entries comprises a keyword of the text description of a given image, an identifier of the given image, and one or more identifiers of one or more source webpages of the text description of the given image;

performing image retrieval and recalling at least one image based on an inputted query and the inverted index;

displaying the at least one image, wherein the performing image retrieval and recalling at least one image based on an inputted query and the inverted index, and displaying the at least one image comprises:

acquiring the inputted query;

recalling the at least one image based on a correlation between the query and the text descriptions of the images in the inverted index; and sorting the at least one image based on the correlation between the query and the text descriptions of the images in the inverted index, and displaying sorted image retrieval results, wherein the sorting comprises: determining that a first correlation between the query and a first keyword in a first entry including a first identifier of a first image is equal to a second correlation between the query and a second keyword in a second entry including a second identifier of a second image; determining that a first number of source webpages of the first image in the first entry is greater than a second number of source webpages of the second image in the second entry; and ranking the second image higher than the first image, in response to determining that the first correlation is equal to the second correlation, and the first number is greater than the second number, wherein the establishing an inverted index for each image of the image groups based on the text descriptions of the each image group comprises:

establishing the inverted index for the each image in the image groups based on a term vector of the text descriptions of the each image group; and accordingly, the performing image retrieval based on the inputted query and the inverted index comprises:

generating a query term vector of the inputted query using a pre-trained term vector model; and performing an image retrieval based on the query term vector and the inverted index.

* * * * *